(12) United States Patent
Maiman et al.

(10) Patent No.: US 12,705,812 B2
(45) Date of Patent: Aug. 11, 2026

(54) SYSTEMS AND METHODS FOR PROVIDING MOBILITY-IMPAIRED TRANSACTIONAL OR IDENTITY DOCUMENTS PROCESSING

(71) Applicant: Capital One Services, LLC, McLean, VA (US)

(72) Inventors: Tyler Maiman, Melville, NY (US); Michael Mossoba, Great Falls, VA (US); Joshua Edwards, Carrollton, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 18/982,003

(22) Filed: Dec. 16, 2024

(65) Prior Publication Data

US 2025/0238772 A1 Jul. 24, 2025

Related U.S. Application Data

(63) Continuation of application No. 18/421,411, filed on Jan. 24, 2024, now Pat. No. 12,205,083.

(51) Int. Cl.

| | |
|---|---|
| ***G06Q 20/04*** | (2012.01) |
| ***G06F 3/01*** | (2006.01) |
| ***G06Q 20/10*** | (2012.01) |
| ***G06Q 20/32*** | (2012.01) |
| ***G06Q 40/02*** | (2023.01) |

(Continued)

(52) U.S. Cl.

CPC ........... *G06Q 20/042* (2013.01); *G06F 3/013* (2013.01); *G06Q 20/108* (2013.01); *G06Q 20/3223* (2013.01); *G06Q 40/02* (2013.01); *G06T 3/4038* (2013.01); *G06T 5/50* (2013.01); *G06T 11/60* (2013.01); *G06T 19/006* (2013.01); *G06V 30/10* (2022.01); *G06V 40/28* (2022.01);

(Continued)

(58) Field of Classification Search

None

See application file for complete search history.

(56) References Cited

U.S. PATENT DOCUMENTS

| | | | |
|---|---|---|---|
| 8,438,110 | B2 | 5/2013 | Calman et al. |
| 8,811,711 | B2 | 8/2014 | Calman et al. |

(Continued)

FOREIGN PATENT DOCUMENTS

| | | |
|---|---|---|
| CN | 105191282 B | 2/2019 |

*Primary Examiner* — Kristy A Haupt

(74) *Attorney, Agent, or Firm* — TROUTMAN PEPPER LOCKE LLP; Christopher J. Forstner; John A. Morrissett

(57) ABSTRACT

Disclosed embodiments may include a method for systems and methods for providing mobility-impaired transactional or identify documents processing. The method may include receiving login credentials associated with an account and a request to deposit a check into the account, and identifying, using an image recognition model, a presence of a check in a visual field of the image capture device. Then the method may include obtaining, via the image capture device, a plurality of digital images of a front side of the check, and generating, based on the plurality of digital images of the front side of the check, a composite image of the front side of the check. The method may further include creating a recording of an endorsement gesture and transmitting the composite image of the front side of the check and the recording of the endorsement gesture to a back-end server.

20 Claims, 4 Drawing Sheets

(51) Int. Cl.

| | |
|---|---|
| ***G06T 3/4038*** | (2024.01) |
| ***G06T 5/50*** | (2006.01) |
| ***G06T 11/60*** | (2026.01) |
| ***G06T 19/00*** | (2011.01) |
| ***G06V 30/10*** | (2022.01) |
| ***G06V 40/20*** | (2022.01) |
| ***H04L 9/40*** | (2022.01) |

(52) U.S. Cl.

CPC .......... *H04L 63/08* (2013.01); *G06T 2200/32* (2013.01); *G06T 2207/20221* (2013.01)

(56) References Cited

U.S. PATENT DOCUMENTS

| | | | | |
|---|---|---|---|---|
| 10,158,634 | B2 | 12/2018 | Votaw et al. | |
| 10,402,790 | B1 * | 9/2019 | Clark | G06Q 20/0425 |
| 10,510,054 | B1 | 12/2019 | Eidam et al. | |
| 10,853,377 | B2 | 12/2020 | Hecht | |
| 12,039,504 | B1 | 7/2024 | Foster | |
| 12,205,083 | B1 * | 1/2025 | Maiman | G06N 20/00 |
| 2012/0230577 | A1 * | 9/2012 | Calman | G06Q 20/0425 382/138 |
| 2014/0188756 | A1 | 7/2014 | Ponnavaikko et al. | |
| 2014/0233831 | A1 * | 8/2014 | Palmer | G06F 16/50 382/137 |
| 2020/0202313 | A1 | 6/2020 | Eidam et al. | |

* cited by examiner

SYSTEMS AND METHODS FOR PROVIDING MOBILITY-IMPAIRED TRANSACTIONAL OR IDENTITY DOCUMENTS PROCESSING

CROSS-REFERENCE TO RELATED APPLICATIONS

This application is a continuation of, and claims priority under 35 U.S.C. § 120 to, Ser. No. 18/421,411, filed Jan. 24, 2024, the entire contents of which are fully incorporated herein by reference.

FIELD OF THE INVENTION

The disclosed technology relates to systems and methods for providing mobility-impaired transactional document processing or identity document verification/processing. Specifically, this disclosed technology relates to using augmented reality devices and machine learning models to generate a composite image of a document (e.g., check for a mobile check deposit) to assist mobility-impaired users.

BACKGROUND

Today, most banks with a digital platform offer a way to digitally deposit a check or upload a document with the user device, such as a smart phone through a banking mobile application. Traditional systems and methods for providing mobile check deposits or document uploads typically require the use of a camera to align a paper within a digital rectangle template displayed on the user device for both sides of the paper. This can be difficult and can result in the mobility-impaired users having to try multiple times to complete the upload.

Accordingly, there is a need for improved systems and methods for systems and methods for providing mobility-impaired transactional or identity documents processing. Embodiments of the present disclosure are directed to this and other considerations.

SUMMARY

Disclosed embodiments may include a system for systems and methods for providing mobility-impaired transactional or identify documents processing. The system may include one or more processors, and memory in communication with the one or more processors and storing instructions that, when executed by the one or more processors, are configured to cause the system to provide systems and methods for providing mobility-impaired transactional or identify documents processing. The system may receive login credentials associated with an account and a request to deposit a check into the account, and identify, using an image recognition model, a presence of a check in a visual field of the image capture device. Then the system may obtain, via the image capture device, a plurality of digital images of a front side of the check, and generate, based on the plurality of digital images of the front side of the check, a composite image of the front side of the check. The system may also create a recording of an endorsement gesture by recording a gesture performed by a user that signifies an endorsement of the check and transmit the composite image of the front side of the check and the recording of the endorsement gesture to a back-end server for storage in association with a record of a check deposit.

Disclosed embodiments may include a system for systems and methods for providing mobility-impaired transactional or identify documents processing. The system may include one or more processors, and memory in communication with the one or more processors and storing instructions that, when executed by the one or more processors, are configured to cause the system to provide systems and methods for providing mobility-impaired transactional or identify documents processing. The system may receive login credentials associated with an account and a request to deposit a check into the account and identify, using an image recognition model, a presence of a check in a visual field of the image capture device. The system may also obtain, via the image capture device, a plurality of digital images of a front side of a check and generate, based on the plurality of digital images of the front side of the check, a composite image of the front side of the check. Additionally, the system may determine, based on one or more of the plurality of digital images of the front side of the check and using a machine learning model, whether the check has already been endorsed and create a recording of an endorsement gesture by recording a gesture performed by a user that signifies an endorsement of the check. Then, the system may transmit the composite image of the front side of the check and the recording of the endorsement gesture to a back-end server for storage in association with a record of a check deposit.

Disclosed embodiments may include a system for systems and methods for providing mobility-impaired transactional or identify documents processing. The system may include one or more processors, and memory in communication with the one or more processors and storing instructions that, when executed by the one or more processors, are configured to cause the system to provide systems and methods for providing mobility-impaired transactional or identify documents processing. The system may receive login credentials associated with an account associated with a user and a request to associate a document with the account and receive a plurality of digital images of a front side of the document. In some embodiments, the plurality of digital images of the front side of the document are obtained by an image capture device of an augmented reality (AR) device. The system may then generate, based on the plurality of digital images of the front side of the document, a composite image of the front side of the check and receive a recording of an endorsement gesture recorded by the AR device. The system then may store the composite image of the front side of the document and the recording of the endorsement gesture in association with a record such that the user may remotely access the composite image of the front side of the document and the recording of the endorsement gesture.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Examples of the present disclosure related to systems and methods for systems and methods for providing mobility-impaired transactional or identify documents processing. More particularly, the disclosed technology relates to assisting mobility-impaired users with transactional or identify documents processing using augmented reality devices and machine learning models to composite an image of a document such as a check for mobile check deposit. The systems and methods described herein utilize, in some instances, machine learning models, which are necessarily rooted in computers and technology. Machine learning models are a unique computer technology that involves training models to complete tasks and make decisions. The present disclosure details capturing a plurality of images of the front side and back side of a transactional or identify document using an image capturing device and then using a machine learning model to generate a composite image of the front side and the back side of the document. This, in some examples, may involve using the plurality of digital images of the document and a machine learning model, applied to juxtapose portions of the plurality of digital images together, and outputs a result of a composite image of the document. Using a machine learning model in this way may allow the system to allow a mobility-impaired user to upload the document without going to a bank. The present disclosure permits the user to use a plurality of images for the document without requiring a clear image of the document to be taken by the user in one shot. Overall, the systems and methods disclosed have significant practical applications in the field because of the noteworthy improvements of the different ways to endorse and record the endorsement of a document using gestures, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 1:
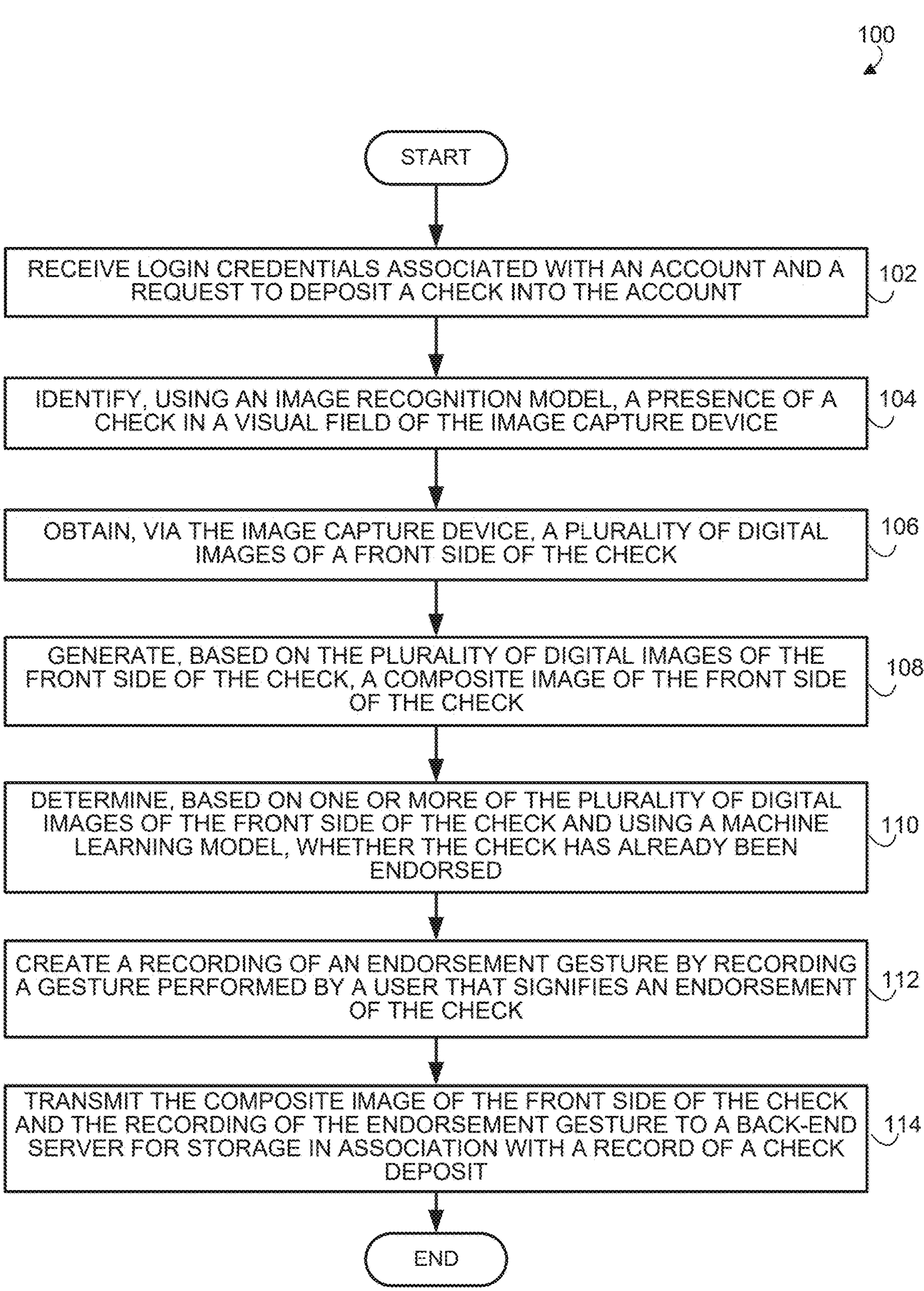
FIG. 1 is a flow diagram illustrating an exemplary method for systems and methods for providing mobility-impaired transactional or identify documents processing in accordance with certain embodiments of the disclosed technology.

FIG. 1 is a flow diagram illustrating an exemplary method 100 for systems and methods for providing mobility-impaired transactional or identify documents processing, in accordance with certain embodiments of the disclosed technology. The steps of method 100 may be performed by one or more components of the system 400 (e.g., digital documentation system 320 or web server 410 of processing system 408 or user device 402), as described in more detail with respect to FIGS. 3 and 4. It should be understood that certain embodiments of the disclosed technology may omit one or more blocks as being optional.

In block 102, the digital documentation system 320 may receive login credentials associated with an account and a request to deposit a check into the account. In some embodiments, the digital documentation system 320 may also receive login credentials associated with a user. In some embodiments, the digital documentation system 320 may authenticate the user to access the account using the login credentials. In some embodiments, the login credentials can be a voice recording or the request to deposit the check can be a voice request. Using voice commands through the user device 402 of the user, the digital documentation system 320 may receive a command to deposit a check into the account of the user.

In block 104, the digital documentation system 320 may identify, using an image recognition model, a presence of a check in a visual field of the image capture device. In some embodiments, prior to the digital documentation system 320 receiving login credentials, a user may place the check on a surface or hold the check in the visual field of the image capture device. In some embodiments, the image recognition model may be an augmented reality (AR) device (or AR headset) 404. In some embodiments, the image recognition model can may include a VR headset, an AR headset, a set of AR glasses, a tablet computer, a set of bionic contact lenses, a smart phone adapted as part of a VR headset, a smart phone adapted as part of the AR device 404, or combinations thereof. In other embodiments, the image recognition model may be any device with a built-in camera configured to capture images, audio, or video. In one embodiment, the digital documentation system 320 may use the built-in camera to scan an environment to detect the presence of the check in the visual field. In some embodiments, the digital documentation system 320 may begin scanning an environment after receiving the request to deposit the check. In other embodiments, the digital documentation system 320 may begin scanning an environment without receiving the request to deposit the check and can transmit a notification to the user device 402 of the user to verify if the user would like to deposit the check.

In block 106, the digital documentation system 320 may obtain, via the image capture device, a plurality of digital images of a front side or a back side of the check. In some embodiments, the digital documentation system 320 may transmit a message to the user device 402 of the user to request whether the user would like to proceed to obtain the plurality of digital images of the front side and back side of the check. In other embodiments, the digital documentation system 320 may create a recording of a video via the image capture device to obtain the plurality of digital images of the front side or the back side of the check. In other embodiments, the digital documentation system 320 may determine that at least a portion of the plurality of digital images is insufficient in quality. The digital documentation system 320 may transmit a message to the user to tilt the user device 402 of the user or to move closer to the check to obtain an additional plurality of digital images of better quality. The digital documentation system 320 may not require a specific angle looking at the check while it obtains the plurality of digital images. In some embodiments, a portion of the plurality of digital images may only be of a portion of the check, which would require generating a composite image of each side of the check.

In block 108, the digital documentation system 320 may generate, based on the plurality of digital images of the front side of the check, a composite image of the front side of the check. In some embodiments, the digital documentation system 320 may generate the composite image of the front side of the check comprises digitally stitching portions of the plurality of digital images together. In some embodiments, the digital documentation system 320 may generate the composite image of a back side of the check and transmit the composite image of the back side of the check to the back-end server for storage in association with the record of the check deposit. In other embodiments, the digital documentation system 320 may select a subset of the plurality of digital images to generate a best version of the composite image of the check. In other embodiments, the digital documentation system 320 may crop out a background of at least a portion of the plurality of digital images to generate the composite image.

In other embodiments, the digital documentation system 320 may analyze, using optical character recognition (OCR) techniques, the plurality of digital images to identify a first set of check information, transmit the first set of check information to a back-end system, and receive, from the back-end system, a second set of check information. The back-end system may identify the second set of check information based on the first set of check information. Additionally, the digital documentation system 320 may overlay the second set of check information onto a digital image that comprises the first set of check information. In some embodiments, the first set of check information can comprise a name and a first portion of an account number and the second set of check information can comprise a second portion of the account number. When juxtaposed, the first portion of the account number and the second portion of the account number can form a complete account number. In other embodiments, the first set of check information may also comprise of a routing number, an account number, a signature of a payor of the check, an amount, a date, a check number, other check information known in the art, or combinations thereof. Similar to the juxtaposing portions of the account number from the plurality of images to form a complete account number, other check information can be juxtaposed and formed together to complete the check information. In some embodiments, if a portion of the check information is juxtaposed together, the digital documentation system 320 may be able to retrieve additional account information to complete additional check information for the check deposit. In a non-limiting example, the digital documentation system 320 may have been able to determine a name of the account holder, which can then be used to retrieve an account number associated with the account or user. In some embodiments, the digital documentation system 320 may verify the account number by comparing it to the portions of the account number extracted from the digital images from the check.

In other embodiments, the digital documentation system 320 may generate the composite image of the front side of the check by using a machine learning model. In some embodiments, the digital documentation system 320 may generate the composite image of the back side of the check by using a machine learning model. The machine learning model may be trained using training data comprising a plurality of sets of digital check images and corresponding sets of resultant composite images. The digital documentation system 320 may use the training methods below to generate the composite images.

In other embodiments, the digital documentation system 320 may determine that the first set of check information is insufficient to determine the second set of check information and generate a prompt to the user to move such that the image capture device can obtain a new set of digital images of the check from a different vantage point. Additionally, in some embodiments, the digital documentation system 320 may analyze, using OCR techniques, the new set of digital images to obtain new check information and, responsive to adding the new check information to the first set of check information, determine that the first set of check information is sufficient to determine the second set of check information.

In block 110, the digital documentation system 320 may determine, based on one or more of the plurality of digital images of the front side of the check and using the machine learning model, whether the check has already been endorsed. The digital documentation system 320 may use the machine learning model to examine a portion of the front side of the check to determine if there are any protrusions, shadows, or colorization (such as ink seeping through the check from the back side of the check) to verify if the check has already been endorsed. If the digital documentation system 320 determines that the check has already been endorsed, the process may terminate. Otherwise, the digital documentation system 320 may proceed to block 112 if the check has not been endorsed. In some embodiments, the digital documentation system 320 may verify if the check is expired by comparing a current date to the date from the check information extracted or stitched together from the check.

In block 112, the digital documentation system 320 may create a recording of an endorsement gesture by recording a gesture performed by a user that signifies an endorsement of the check. In some embodiments, the endorsement gesture may be a verbal statement or gesture from the user. The gesture from the user can include a body movement such as eye movement or a hand movement. The recording of a gesture performed by the user that signifies an endorsement of the check may also comprise one or more of: recording, via the image capture device, a hand gesture of the user, recording, via the image capture device, one or more taps performed by the user with a finger, recording, via an audio recording device, an audio signature performed by the user, or recording, via the image capture device, an eye movement of the user. The gesture from the user can be authenticated using historical gestures associated with the account of the user. Historical gestures can include historical login credential recordings, historical verbal statements, or historical eye scans. In some embodiments, the endorsement gesture can be further authenticated by using a location of the user device 402 of the user and comparing it to historical locations associated with the account of the user. A captcha can also be used in some embodiments to authenticate the endorsement gesture. In some embodiments, the digital documentation system 320 may receive a request to use the recording of the endorsement gesture or another digital endorsement.

In some embodiments, the digital documentation system 320 may transmit the composite image of the check to an application for endorsement such as a program like DocuSign. Prior to transmitting the composite image of the check to an application for endorsement, the digital documentation system 320 may authenticate the user for the use of the application by receiving a verbal command or gesture from the user. The gesture from the user can include a body movement such as eye movement or a hand movement to approve the authentication of the check. In other embodiments, the digital documentation system 320 may send a request to the user device 402 of the user to begin a process to capture a composite image of the back side of the check to capture the endorsement on the check. The digital documentation system 320 may then identify, using the image recognition model, the presence of the check in the visual field of the image capture device. Then the digital documentation system 320 may obtain, via the image capture device, another plurality of digital images of the back side of the check.

In some embodiments, the digital documentation system 320 may receive a notice that the current endorsement on the back side of the check is insufficient. After receiving a notice of an insufficient current endorsement, in some embodiments, the digital documentation system 320 may generate an overlayed check by overlaying an electric signature on the composite image of the back side of the check and store the overlayed check in a database or back-end server. In other embodiments, the digital documentation system 320 may extract data from a back-end server or database and compare information from the composite image of the check to the extracted data to verify if the check has already been deposited internally or by an external entity. In other embodiments, the digital documentation system 320 may transmit a message to the user or the user device 402 of the user to indicate that the check has already been deposited.

In block 114, the digital documentation system 320 may transmit the composite image of the front side of the check and the recording of the endorsement gesture to a back-end server for storage in association with a record of a check deposit. Additionally, in some embodiments, the digital documentation system 320 can complete the deposit of the check by transmitting a completion message to the user device 402 of the user. In some embodiments, the recording of the endorsement gesture can be stored in the back-end server for auditing purposes.

In other embodiments, the digital documentation system 320 may identify, using the image recognition model, a first presence of transactional documents or identification documents. Transactional documents that will be processed by the digital documentation system 320 can be any documents related to a transaction (i.e., invoices, receipts, orders, payments, checks, cashier's check, etc.). Identification documents that will be processed by the digital documentation system 320 can be any identification document known in the art (i.e., passports, driver's licenses, social security cards, tax identification cards, etc.). The digital documentation system 320 can be configured to process the transactional documents or identification documents using augmented reality devices and machine learning models to generate a composite image of the transactional documents or identification documents. For example, in some embodiments, prior to the digital documentation system 320 receiving login credentials, the user may place the transactional documents or identification documents on a surface or hold the transactional documents or identification documents in the visual field of the image capture device. In one embodiment, the digital documentation system 320 may use the built-in camera to scan the environment to detect the first presence of the transactional documents or identification documents in the visual field. In some embodiments, the digital documentation system 320 may begin scanning the environment after receiving a document request to scan the transactional documents or identification documents. In other embodiments, the digital documentation system 320 may begin scanning the environment without receiving the document request to scan the transactional documents or identification documents and can transmit a first notification to the user device 402 of the user to verify if the user would like to scan the transactional documents or identification documents.

In other embodiments, digital documentation system 320 may obtain, via the image capture device, a second plurality of digital images of a document front side or a document back side of one of the transactional documents or identification documents. In some embodiments, the digital documentation system 320 may transmit a second message to the user device 402 of the user to request whether the user would like to proceed to obtain the plurality of digital images of the document front side and document back side of one of the transactional documents or identification documents. In other embodiments, the digital documentation system 320 may create a second recording of a second video via the image capture device to obtain the plurality of digital images of the document front side or the document back side of the one of the transactional documents or identification documents. In other embodiments, the digital documentation system 320 may determine that at least a portion of the plurality of digital images is insufficient in quality. The digital documentation system 320 may transmit a message to the user to tilt the user device 402 of the user or to move closer to the transactional documents or identification documents to obtain an additional plurality of digital images of better quality. The digital documentation system 320 may not require a specific angle looking at the transactional documents or identification documents while it obtains the plurality of digital images. In some embodiments, a portion of the plurality of digital images may only be of a portion of the transactional documents or identification documents, which would require generating a composite image of each side of the transactional documents or identification documents.

In other embodiments, the digital documentation system 320 may analyze, using optical character recognition (OCR) techniques, the plurality of digital images to identify a third set of document information, transmit the third set of document information to a back-end system, and receive, from the back-end system, a fourth set of document information. The back-end system may identify the fourth set of document information based on the third set of document information. Additionally, the digital documentation system 320 may overlay the fourth set of document information onto a digital image that comprises the third set of document information. In some embodiments, the third set of document information can comprise a name and a first portion of an identification number and the fourth set of document information can comprise a second portion of the identification number. When juxtaposed, the first portion of the identification number and the second portion of the identification number can form a complete identification number. In other embodiments, the third set of document information may also comprise of an invoice number, a payment number, a signature, an amount, a date (i.e., birth date, expiration date, etc.), a document number, other document information known in the art, or combinations thereof. Similar to the juxtaposing portions of the identification number from the plurality of images to form a complete identification number, other check information can be juxtaposed and formed together to complete the identification information. In some embodiments, if a portion of the document information is juxtaposed together, the digital documentation system 320 may be able to retrieve additional document information to complete additional document information. In a non-limiting example, the digital documentation system 320 may have been able to determine a name of the account holder, which can then be used to retrieve an identification number associated with the account or user. In some embodiments, the digital documentation system 320 may verify the identification number by comparing it to the portions of the identification number extracted from the digital images from the transactional documents or identification documents.

Any of the above or below methods outlined in blocks 102-114 of method 100 or blocks 202-210 of method 200 may be used with the transactional documents or identification documents (i.e., train the machine learning model to generate composite images of the transactional documents or identification documents, obtain a new set of digital images of the transactional documents or identification documents from a different vantage point, verify if the transactional documents or identification documents have been endorsed or are expired, create an endorsement of the transactional documents or identification documents, etc.). The methods outlined in blocks 102-114 are not repeated herein for brevity.

Figure 2:
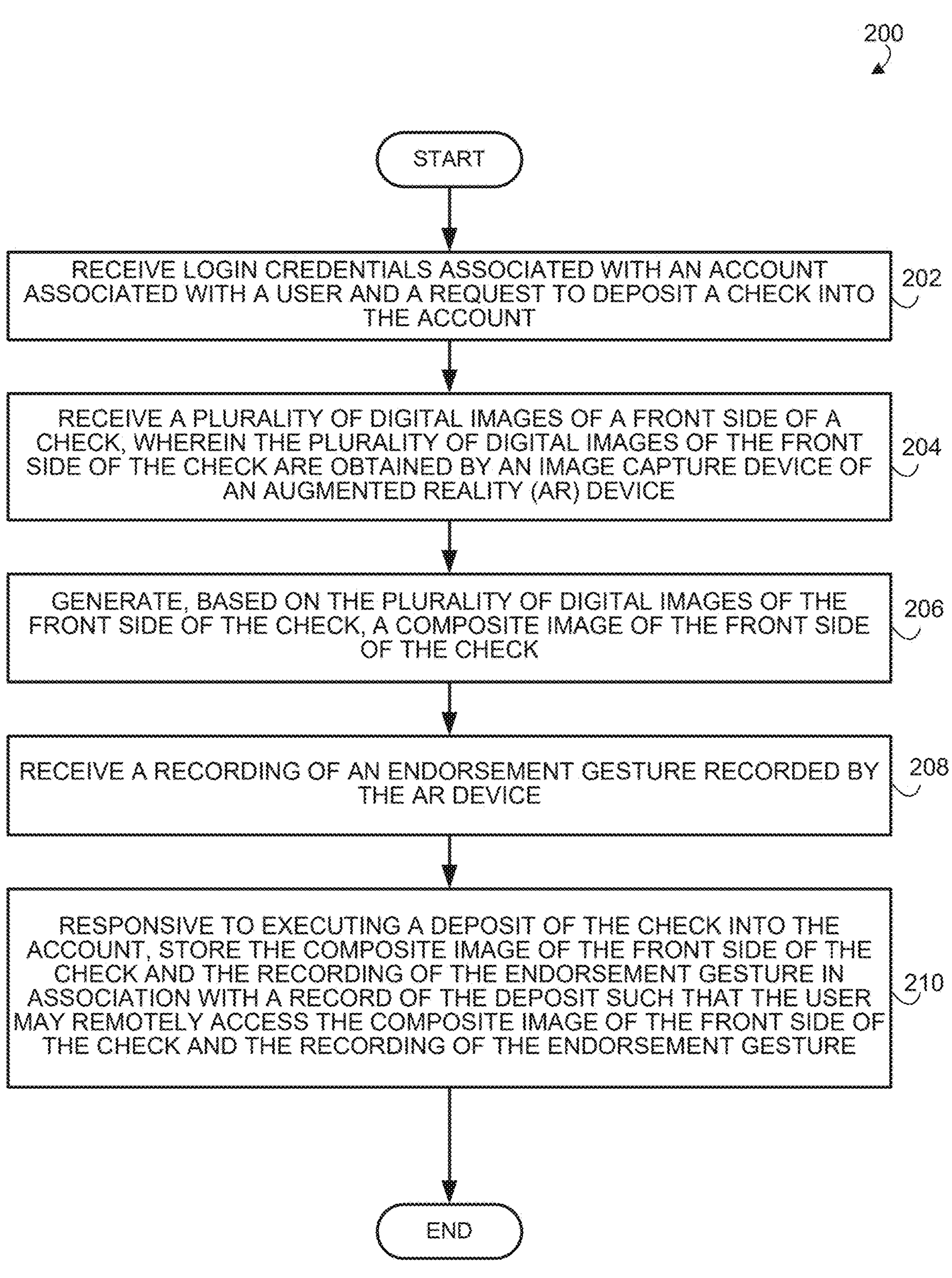
FIG. 2 is a flow diagram illustrating an exemplary method for systems and methods for providing mobility-impaired transactional or identify documents processing in accordance with certain embodiments of the disclosed technology.

FIG. 2 is a flow diagram illustrating an exemplary method 200 for systems and methods for providing mobility-impaired transactional or identify documents processing, in accordance with certain embodiments of the disclosed technology. The steps of method 200 may be performed by one or more components of the system 400 (e.g., digital documentation system 320 or web server 410 of processing system 408 or user device 402), as described in more detail with respect to FIGS. 3 and 4.

Method 200 of FIG. 2 is similar to method 100 of FIG. 1, except that method 200 may not include blocks 104, 106, 110, 112, or 114 of method 100. The descriptions of blocks 202 and 206 in method 200 are similar to the respective descriptions of blocks 102 and 108 of method 100 and are not repeated herein for brevity. Additional blocks 204, 208, and 210 are described below.

In block 204, the digital documentation system 320 may receive a plurality of digital images of a front side of a check. In some embodiments, the plurality of digital images of the front side of the check are obtained by an image capture device of an AR device. In some embodiments, the plurality of digital images of the front side of a check can be received from the user device 402 of the user. In one embodiment, the digital documentation system 320 may use the built-in camera of the AR device to scan an environment to detect the presence of the check in the visual field. In some embodiments, the digital documentation system 320 may begin scanning an environment after receiving the request to deposit the check. In other embodiments, the digital documentation system 320 may begin scanning an environment without receiving the request to deposit the check and can transmit a notification to the user device 402 of the user to verify if the user would like to deposit the check.

In block 208, the digital documentation system 320 may receive a recording of an endorsement gesture recorded by the AR device. In some embodiments, the endorsement gesture may be a verbal statement or gesture from the user. The gesture from the user can include a body movement such as eye movement or a hand movement. The recording of a gesture performed by the user that signifies an endorsement of the check may also comprise one or more of: a hand gesture of the user, one or more taps performed by the user with a finger, an audio signature performed by the user, or an eye movement of the user. The gesture from the user can be authenticated using historical gestures associated with the account of the user. Historical gestures can include historical login credential recordings, historical verbal statements, or historical eye scans. In some embodiments, the endorsement gesture can be further authenticated by using a location of the user device 402 of the user and comparing it to historical locations associated with the account of the user. A captcha can also be used in some embodiments to authenticate the endorsement gesture.

In block 210, the digital documentation system 320 may in response to executing a deposit of the check into the account, store the composite image of the front side of the check and the recording of the endorsement gesture in association with a record of the deposit such that the user may remotely access the composite image of the front side of the check and the recording of the endorsement gesture.

Figure 3:
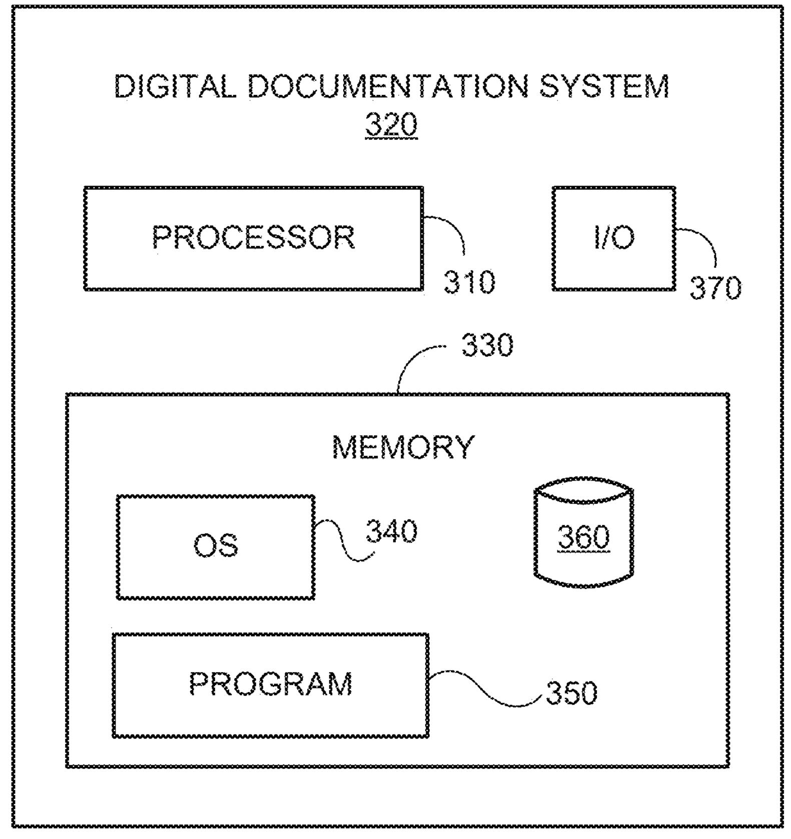
FIG. 3 is block diagram of an example digital documentation system used to provide systems and methods for providing mobility-impaired transactional or identify documents processing, according to an example implementation of the disclosed technology.
Figure 4:
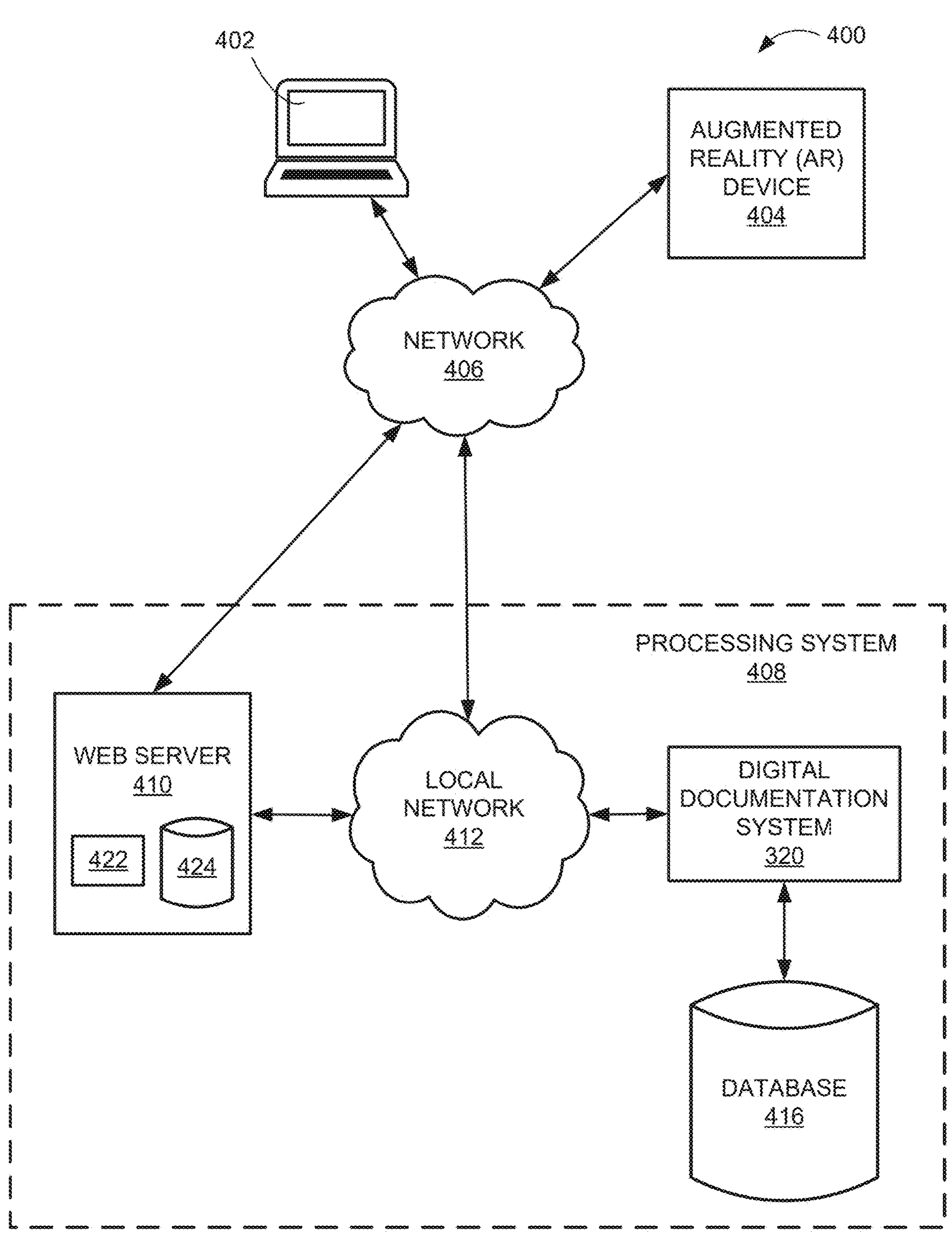
FIG. 4 is block diagram of an example system that may be used to provide systems and methods for providing mobility-impaired transactional or identify documents processing, according to an example implementation of the disclosed technology.

FIG. 3 is a block diagram of an example digital documentation system 320 used to assist mobility-impaired users with a document processing according to an example implementation of the disclosed technology. According to some embodiments, the user device 402 and web server 410, as depicted in FIG. 4 and described below, may have a similar structure and components that are similar to those described with respect to digital documentation system 320 shown in FIG. 3. As shown, the digital documentation system 320 may include a processor 310, an input/output (I/O) device 370, a memory 330 containing an operating system (OS) 340 and a program 350. In certain example implementations, the digital documentation system 320 may be a single server or may be configured as a distributed computer system including multiple servers or computers that interoperate to perform one or more of the processes and functionalities associated with the disclosed embodiments. In some embodiments digital documentation system 320 may be one or more servers from a serverless or scaling server system. In some embodiments, the digital documentation system 320 may further include a peripheral interface, a transceiver, a mobile network interface in communication with the processor 310, a bus configured to facilitate communication between the various components of the digital documentation system 320, and a power source configured to power one or more components of the digital documentation system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the digital documentation system 320 may include one or more storage devices configured to store information used by the processor 310 (or other components) to perform certain functions related to the disclosed embodiments. In one example, the digital documentation system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The digital documentation system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the digital documentation system 320 may include the memory 330 that may include one or more programs 350 to perform one or more functions of the disclosed embodiments. For example, in some embodiments, the digital documentation system 320 may additionally manage dialogue and/or other interactions with the customer via a program 350.

The processor 310 may execute one or more programs 350 located remotely from the digital documentation system 320. For example, the digital documentation system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a digital documentation system database 360 for storing related data to enable the digital documentation system 320 to perform one or more of the processes and functionalities associated with the disclosed embodiments.

The digital documentation system database 360 may include stored data relating to status data (e.g., average session duration data, location data, idle time between sessions, and/or average idle time between sessions) and historical status data. According to some embodiments, the functions provided by the digital documentation system database 360 may also be provided by a database that is external to the digital documentation system 320, such as the database 416 as shown in FIG. 4.

The digital documentation system 320 may also be communicatively connected to one or more memory devices (e.g., databases) locally or through a network. The remote memory devices may be configured to store information and may be accessed and/or managed by the digital documentation system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The digital documentation system 320 may also include one or more I/O devices 370 that may comprise one or more interfaces for receiving signals or input from devices and providing signals or output to one or more devices that allow data to be received and/or transmitted by the digital documentation system 320. For example, the digital documentation system 320 may include interface components, which may provide interfaces to one or more input devices, such as one or more keyboards, mouse devices, touch screens, track pads, trackballs, scroll wheels, digital cameras, microphones, sensors, and the like, that enable the digital documentation system 320 to receive data from a user (such as, for example, via the user device 402).

In examples of the disclosed technology, the digital documentation system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The digital documentation system 320 may contain programs that train, implement, store, receive, retrieve, and/or transmit one or more machine learning models. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The digital documentation system 320 may be configured to adjust model parameters during training. Model parameters may include weights, coefficients, offsets, or the like. Training may be supervised or unsupervised.

The digital documentation system 320 may be configured to train machine learning models by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The digital documentation system 320 may be configured to optimize statistical models using known optimization techniques.

While the digital documentation system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the digital documentation system 320 may include a greater or lesser number of components than those illustrated.

FIG. 4 is a block diagram of an example system that may be used to view and interact with processing system 408, according to an example implementation of the disclosed technology. The components and arrangements shown in FIG. 4 are not intended to limit the disclosed embodiments as the components used to implement the disclosed processes and features may vary. As shown, processing system 408 may interact with a user device 402 via a network 406. In certain example implementations, the processing system 408 may include a local network 412, a digital documentation system 320, a web server 410, and a database 416.

In some embodiments, a user may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the processing system 408. In some embodiments, the user device 402 may include or incorporate electronic communication devices for hearing or vision impaired users.

Users may include individuals such as, for example, subscribers, clients, prospective clients, or customers of an entity associated with an organization, such as individuals who have obtained, will obtain, or may obtain a product, service, or consultation from or conduct a transaction in relation to an entity associated with the processing system 408. According to some embodiments, the user device 402 may include an environmental sensor for obtaining audio or visual data, such as a microphone and/or digital camera, a geographic location sensor for determining the location of the user device 402, an input/output device such as a transceiver for sending and receiving data, a display for displaying digital images, one or more processors, and a memory in communication with the one or more processors.

The network 406 may be of any suitable type, including individual connections via the internet such as cellular or WiFi networks. In some embodiments, the network 406 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The processing system 408 may be associated with and optionally controlled by one or more entities such as a business, corporation, individual, partnership, or any other entity that provides one or more of goods, services, and consultations to individuals such as customers. In some embodiments, the processing system 408 may be controlled by a third party on behalf of another business, corporation, individual, partnership. The processing system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the digital documentation system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the processing system 408 to interact with one another and to connect to the network 406 for interacting with components in the system 400 environment. In some embodiments, the local network 412 may include an interface for communicating with or linking to the network 406. In other embodiments, certain components of the processing system 408 may communicate via the network 406, without a separate local network 406.

The processing system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access processing system 408 using the cloud computing environment. User device 402 may be able to access processing system 408 using specialized software. The cloud computing environment may eliminate the need to install specialized software on user device 402.

In accordance with certain example implementations of the disclosed technology, the processing system 408 may include one or more computer systems configured to compile data from a plurality of sources the digital documentation system 320, web server 410, and/or the database 416. The digital documentation system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Example Use Case

The following example use case describes an example of a typical user flow pattern. This section is intended solely for explanatory purposes and not in limitation.

In one example, a customer John is mobility-impaired and has a user device 402. The user device 402 is an augmented reality headset. John needs to process a transactional document such as depositing a check using a mobile application. To gain access to the account, John may send login credentials associated with his account and a login request to deposit the check into the account by using the digital documentation system 320. The digital documentation system 320 may receive the login credentials and the login request through the augmented reality headset. The digital documentation system 320 may then identify a presence of a check in a visual field of the augmented reality headset. After the presence of the check is identified, the digital documentation system 320 may obtain a plurality of digital images of the front side of the check by taking multiple digital images using a camera built into the augmented reality headset. The digital documentation system 320 may then generate a composite image of the front side and the back side of the check by using a machine learning model. Then, the digital documentation system 320 may create a recording of an endorsement gesture by recording a gesture performed by John such as moving his eyes in a predetermined pattern. The eye movement could signify and endorsement of the check. Then, the digital documentation system 320 may transmit the composite image of the front side of the check and the back side of the check along with the recording of the endorsement gesture to a back-end server of the bank for storage.

Because John is outside of the country, John's cell phone or user device 402 geolocation is not within a known customer geographic region. In responsive to determining the geolocation of the cell phone or user device 402 falls outside of the known customer geographic region, the fraud prevention system 320 may select/determine one or more first step-up authentication methods and transmit a request for a first step-up authentication information associated with the one or more step-up authentication methods to John's cell phone, receive, via the cell phone, the first step-up authentication information using one or more step-up authentication methods, and determine whether the first step-up authentication information matches known first step-up authentication information. In response to determining that the first step-up authentication information matches a known first step-up authentication information, the fraud prevention system 320 may authorize the user device 402 to access the account of the user. Because John only wishes to check the balance of his account, the fraud prevention system 320, utilizing a machine learning model, may decide that a second step-up authentication method is not necessary.

In some examples, disclosed systems or methods may involve one or more of the following clauses:

Clause 1: A system comprising: an image capture device; one or more processors; and a memory in communication with the one or more processors and storing instructions that, when executed by the one or more processors, are configured to cause the system to: receive login credentials associated with an account and a request to deposit a check into the account;

identify, using an image recognition model, a presence of a check in a visual field of the image capture device; obtain, via the image capture device, a plurality of digital images of a front side of the check; generate, based on the plurality of digital images of the front side of the check, a composite image of the front side of the check; create a recording of an endorsement gesture by recording a gesture performed by a user that signifies an endorsement of the check; and transmit the composite image of the front side of the check and the recording of the endorsement gesture to a back-end server for storage in association with a record of a check deposit.

Clause 2: The system of clause 1, wherein the system comprises an augmented reality device.

Clause 3: The system of clause 1, wherein generating the composite image of the front side of the check comprises digitally stitching portions of the plurality of digital images together.

Clause 4: The system of clause 1, wherein generating the composite image of the front side of the check comprises: analyzing, using optical character recognition (OCR) techniques, the plurality of digital images to identify a first set of check information; transmitting the first set of check information to a back-end system; receiving, from the back-end system, a second set of check information, wherein the back-end system identified the second set of check information based on the first set of check information; and overlaying the second set of check information onto a digital image that comprises the first set of check information.

Clause 5: The system of clause 4, wherein the first set of check information comprises a name and a first portion of an account number and the second set of check information comprises a second portion of the account number, wherein when juxtaposed, the first portion of the account number and the second portion of the account number form a complete account number.

Clause 6: The system of clause 4, wherein the instructions are further configured to cause the system to: determine that the first set of check information is insufficient to determine the second set of check information; generate a prompt to the user to move such that the image capture device can obtain a new set of digital images of the check from a different vantage point; analyze, using OCR techniques, the new set of digital images to obtain new check information; and responsive to adding the new check information to the first set of check information, determine that the first set of check information is sufficient to determine the second set of check information.

Clause 7: The system of clause 1, wherein the composite image of the front side of the check comprises: a routing number; an account number; a signature of a payor of the check; an amount; a date; and a check number.

Clause 8: The system of clause 1, wherein the composite image of the front side of the check is generated by a machine learning model, wherein the machine learning model has been trained using training data comprising a plurality of sets of digital check images and corresponding sets of resultant composite images.

Clause 9: The system of clause 1, wherein recording a gesture performed by the user that signifies an endorsement of the check comprises one or more of: recording, via the image capture device, a hand gesture of the user; recording, via the image capture device, one or more taps performed by the user with a finger; recording, via an audio recording device, an audio signature performed by the user; and recording, via the image capture device, an eye movement of the user.

Clause 10: The system of clause 1, wherein the instructions are further configured to cause the system to: generate, based on the recording of the endorsement gesture, a composite image of a back side of the check, wherein the composite image of the back side of the check comprises an indication that the check has been endorsed; and transmit the composite image of the back side of the check to the back-end server for storage in association with the record of the check deposit.

Clause 11: A system comprising: an image capture device; one or more processors; and a memory in communication with the one or more processors and storing instructions that, when executed by the one or more processors, are configured to cause the system to: receive login credentials associated with an account and a request to deposit a check into the account; identify, using an image recognition model, a presence of a check in a visual field of the image capture device; obtain, via the image capture device, a plurality of digital images of a front side of a check; generate, based on the plurality of digital images of the front side of the check, a composite image of the front side of the check; determine, based on one or more of the plurality of digital images of the front side of the check and using a machine learning model, whether the check has already been endorsed; create a recording of an endorsement gesture by recording a gesture performed by a user that signifies an endorsement of the check; and transmit the composite image of the front side of the check and the recording of the endorsement gesture to a back-end server for storage in association with a record of a check deposit.

Clause 12: The system of clause 11, wherein the machine learning model has been trained with training data that comprises training images of front sides of a plurality of test checks and a corresponding classification for each of the plurality of test checks, wherein the corresponding classification provides an indication of whether the test check has already been endorsed.

Clause 13: The system of clause 12, wherein determining whether the check has already been endorsed comprises the machine learning model receiving as inputs, a portion of one or more of the plurality of digital images, wherein the portion corresponds to an area of the front side of the check that is opposite an area on a back side of the check that is designated for providing a signature.

Clause 14: The system of clause 12, wherein creating a recording of the endorsement gesture is performed in response to the machine learning model determining that the check has not already been endorsed.

Clause 15: The system of clause 11, wherein the instructions are further configured to cause the system to: responsive to the machine learning model determining that the check has already been endorsed: generate a prompt to the user to move such that the visual field of the image capture device changes; and identify, using the image recognition model, a presence of another check in the visual field of the image capture device.

Clause 16: A system comprising: one or more processors; and a memory in communication with the one or more processors and storing instructions that, when executed by the one or more processors, are configured to cause the system to: receive login credentials associated with an account associated with a user and a request to associate a document with the account; receive a plurality of digital images of a front side of the document, wherein the plurality of digital images of the front side of the document are obtained by an image capture device of an augmented reality (AR) device; generate, based on the plurality of digital images of the front side of the document, a composite image of the front side of the document; receive a recording of an endorsement gesture recorded by the AR device; and store the composite image of the front side of the document and the recording of the endorsement gesture in association with a record such that the user may remotely access the composite image of the front side of the document and the recording of the endorsement gesture.

Clause 17: The system of claim 16, wherein the document is a check and generating the composite image of the front side of the check comprises digitally stitching portions of the plurality of digital images together.

Clause 18: The system of claim 16, wherein the document is a check and generating the composite image of the front side of the check comprises: analyzing, using optical character recognition (OCR) techniques, the plurality of digital images to identify a first set of check information; accessing account information based on the first set of check information to determine a second set of check information; and overlaying the second set of check information onto a digital image that comprises the first set of check information.

Clause 19: The system of claim 18, wherein the instructions are further configured to cause the system to: determine that the first set of check information is insufficient to determine the second set of check information; transmit a request to the AR device to prompt the user to move such that the image capture device of the AR device can obtain a new set of digital images of the check from a different vantage point; analyze, using OCR techniques, the new set of digital images to obtain new check information; and responsive to adding the new check information to the first set of check information, determine that the first set of check information is sufficient to determine the second set of check information.

Clause 20: The system of claim 16, wherein the document is a check and the recording of the endorsement gesture comprises one or more of: a digital video recording of a hand gesture of the user; a digital video recording of one or more taps performed by the user with a finger; an audio recording of an audio signature performed by the user; and a digital video recording of an eye movement of the user.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all, or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms “component,” “module,” “system,” “server,” “processor,” “memory,” and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions, user devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in the device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:

an image capture device;

one or more processors; and a memory in communication with the one or more processors and storing instructions that, when executed by the one or more processors, are configured to cause the system to:

identify, using an image recognition model, a presence of a document in a visual field of the image capture device;

obtain, via the image capture device, a plurality of digital images of a first side of the document;

generate, based on the plurality of digital images of the first side of the document using a machine learning model, a composite image of the first side of the document by juxtaposing portions of the plurality of digital images together; and transmit the composite image of the first side of the document to a back-end server for storage.

2. The system of claim 1, wherein the system comprises an augmented reality device.

3. The system of claim 1, wherein generating the composite image of the first side of the document comprises:

analyzing, using optical character recognition (OCR) techniques, the plurality of digital images to identify a first set of document information;

transmitting the first set of document information to a back-end system;

receiving, from the back-end system, a second set of document information, wherein the back-end system identified the second set of document information based on the first set of document information; and overlaying the second set of document information onto a digital image that comprises the first set of document information.

4. The system of claim 3, wherein the first set of document information comprises a name and a first portion of an account number and the second set of document information comprises a second portion of the account number, wherein when juxtaposed, the first portion of the account number and the second portion of the account number form a complete account number.

5. The system of claim 3, wherein the instructions are further configured to cause the system to:

determine that the first set of document information is insufficient to determine the second set of document information;

generate a prompt to a user to move such that the image capture device can obtain a new set of digital images of the document from a different vantage point;

analyze, using OCR techniques, the new set of digital images to obtain new document information; and responsive to adding the new document information to the first set of document information, determine that the first set of document information is sufficient to determine the second set of document information.

6. The system of claim 1, wherein the composite image of the first side of the document comprises:

a routing number;

an account number;

a signature of a payor of the document;

an amount;

a date;

a document number; or combinations thereof.

7. The system of claim 1, wherein the machine learning model has been trained using training data comprising a plurality of sets of digital document images and corresponding sets of resultant composite images.

8. The system of claim 1, wherein the instructions are further configured to cause the system to:

create a recording of an endorsement gesture by recording a gesture performed by a user that signifies an endorsement of the document; and transmit the recording of the endorsement gesture to the back-end server for storage in association with a record of the document, wherein recording the gesture performed by the user that signifies an endorsement of the document comprises one or more of:

recording, via the image capture device, a hand gesture of the user;

recording, via the image capture device, one or more taps performed by the user with a finger;

recording, via an audio recording device, an audio signature performed by the user; and recording, via the image capture device, an eye movement of the user.

9. The system of claim 8, wherein the instructions are further configured to cause the system to:

generate, based on the recording of the endorsement gesture, a composite image of a second side of the document, wherein the composite image of the second side of the document comprises an indication that the document has been endorsed; and transmit the composite image of the second side of the document to the back-end server for storage.

10. The system of claim 1, wherein the instructions are further configured to cause the system to:

receive, via a voice recording, a request to process the document.

11. A system comprising:

an image capture device;

one or more processors; and a memory in communication with the one or more processors and storing instructions that, when executed by the one or more processors, are configured to cause the system to:

identify, using an image recognition model, a presence of a document in a visual field of the image capture device;

obtain, via the image capture device, a plurality of digital images of a first side of a document;

generate, based on the plurality of digital images of the first side of the document, a composite image of the first side of the document;

obtain, via the image capture device, a second plurality of digital images of a second side of the document;

generate, based on the second plurality of digital images of the second side of the document, a composite image of the second side of the document; and transmit the composite image of the first side of the document and the composite image of the second side of the document to a back-end server for storage.

12. The system of claim 11, wherein the instructions are further configured to cause the system to:

create a recording of an endorsement gesture by recording a gesture performed by a user that signifies an endorsement of the document;

determine, based on one or more of the plurality of digital images of the first side of the document and using a machine learning model, whether the document has already been endorsed; and transmit the recording of the endorsement gesture to the back-end server for storage in association with a record of the document, wherein the machine learning model has been trained with training data that comprises training images of first sides of a plurality of test documents and a corresponding classification for each of the plurality of test documents, wherein the corresponding classification provides an indication of whether the test document has already been endorsed.

13. The system of claim 12, wherein determining whether the document has already been endorsed comprises the machine learning model receiving as inputs, a portion of one or more of the plurality of digital images, wherein the portion corresponds to an area of the first side of the document that is designated for providing a signature.

14. The system of claim 12, wherein the instructions are further configured to cause the system to:

responsive to the machine learning model determining that the document has already been endorsed:

generate a prompt to the user to move such that the visual field of the image capture device changes; and identify, using the image recognition model, a presence of another document in the visual field of the image capture device.

15. The system of claim 11, wherein the instructions are further configured to cause the system to:

scan an environment to detect the presence of the document prior to receiving a request to process the document; and transmit a notification to a user to confirm whether to process the document.

16. A system comprising:

one or more processors; and a memory in communication with the one or more processors and storing instructions that, when executed by the one or more processors, are configured to cause the system to:

receive a plurality of digital images of a first side of a document, wherein the plurality of digital images of the first side of the document are obtained by an image capture device of an augmented reality (AR) device;

generate, based on the plurality of digital images of the first side of the document, a composite image of the first side of the document;

analyze the composite image to extract a first identification number;

verify the first identification number associated with the document by comparing a second identification number associated with a user to portions of the first identification number from the plurality of digital images; and store the composite image of the first side of the document such that the user may remotely access the composite image of the first side of the document.

17. The system of claim 16, wherein generating the composite image of the first side of the document comprises digitally stitching portions of the plurality of digital images together.

18. The system of claim 16, wherein generating the composite image of the first side of the document comprises:

analyzing, using optical character recognition (OCR) techniques, the plurality of digital images to identify a first set of document information;

accessing account information based on the first set of document information to determine a second set of document information; and overlaying the second set of document information onto a digital image that comprises the first set of document information.

19. The system of claim 18, wherein the instructions are further configured to cause the system to:

determine that the first set of document information is insufficient to determine the second set of document information;

transmit a request to the AR device to prompt the user to move such that the image capture device of the AR device can obtain a new set of digital images of the document from a different vantage point;

analyze, using OCR techniques, the new set of digital images to obtain new document information; and responsive to adding the new document information to the first set of document information, determine that the first set of document information is sufficient to determine the second set of document information.

20. The system of claim 16, wherein the instructions are further configured to cause the system to:

create a recording of an endorsement gesture by recording a gesture performed by a user that signifies an endorsement of the document, wherein the recording of the endorsement gesture comprises one or more of:

a digital video recording of a hand gesture of the user;

a digital video recording of one or more taps performed by the user with a finger;

an audio recording of an audio signature performed by the user; and a digital video recording of an eye movement of the user.

* * * * *